(12) United States Patent
Fujita et al.

(10) Patent No.: US 6,676,218 B2
(45) Date of Patent: Jan. 13, 2004

(54) VEHICLE SEAT

(75) Inventors: Etsunori Fujita, Hiroshima (JP); Seiji Kawsaki, Hiroshima (JP); Seiji Sesaki, Hiroshima (JP); Tatsuya Oda, Hiroshima (JP); Yuji Ikeda, Hiroshima (JP)

(73) Assignee: Delta Tooling Co., Ltd., Hiroshima (JP)

(*) Notice: Subject to any disclaimer, the term of this patent is extended or adjusted under 35 U.S.C. 154(b) by 0 days.

(21) Appl. No.: 10/053,829

(22) Filed: Jan. 22, 2002

(65) Prior Publication Data

US 2002/0135218 A1 Sep. 26, 2002

(30) Foreign Application Priority Data

Jan. 24, 2001 (JP) .................................... 2001-015368

(51) Int. Cl.[7] ................................................. A47C 7/02
(52) U.S. Cl. ........................ 297/452.49; 297/452.52; 297/452.56
(58) Field of Search ................... 297/452.49, 452.52, 297/452.56, 452.18, 452.13, 216.1, 452.2

(56) References Cited

U.S. PATENT DOCUMENTS

| | | | | |
|---|---|---|---|---|
| 3,762,770 A | | 10/1973 | Tedesco et al. | ............. 297/452 |
| 3,797,886 A | | 3/1974 | Griffiths | ..................... 297/452 |
| 4,492,408 A | * | 1/1985 | Lohr | ....................... 297/344.1 |
| 4,869,554 A | * | 9/1989 | Abu-Isa et al. | ........ 297/452.56 |
| 5,088,793 A | * | 2/1992 | Mithuhiro | .............. 297/452.52 |
| 5,582,463 A | * | 12/1996 | Linder et al. | ............ 297/452.2 |
| 5,624,161 A | * | 4/1997 | Sorimachi et al. | ..... 297/452.52 |
| 5,632,526 A | * | 5/1997 | McLarty et al. | ....... 297/452.64 |
| 6,116,694 A | * | 9/2000 | Bullard | .................. 297/452.52 |
| 6,158,815 A | * | 12/2000 | Sugie et al. | ........... 297/452.61 |
| 6,302,487 B1 | * | 10/2001 | Fujita et al. | ........... 297/452.56 |
| 6,435,618 B1 | * | 8/2002 | Kawasaki | .............. 297/452.56 |

FOREIGN PATENT DOCUMENTS

| | | |
|---|---|---|
| EP | 0152176 | 8/1985 |
| EP | 1084902 | 3/2001 |
| FR | 837966 | 2/1939 |
| GB | 555551 | 8/1943 |

* cited by examiner

Primary Examiner—Peter M. Cuomo
Assistant Examiner—Stephanie Harris
(74) Attorney, Agent, or Firm—Steinberg & Raskin, P.C.

(57) ABSTRACT

An object of the present invention is to minimize the dependency of the vibration characteristic exhibited by the sheet-shaped supporting member supported by the metal springs on the added load. In a plurality of metal springs 41 to 44 supporting a sheet-shaped supporting member 30, a third metal spring 43 provided on the position to support the vicinity of the greater trochanter of the seated person is provided in a manner that an engagement portion with a frame member is positioned lower than the engagement portion with the sheet-shaped supporting member 30 when no load is applied. Accordingly, the feeling of something foreign created by such a third metal spring 43 can be reduced, and within a predetermined range of the added load, the third metal spring does not work functionally because respective engagement portions 43a and 43b take their positional relationship to be substantially horizontal in a static seating state, while it works functionally when the added load exceeds the above-described range. As a result, difference in added load can be reduced.

4 Claims, 7 Drawing Sheets

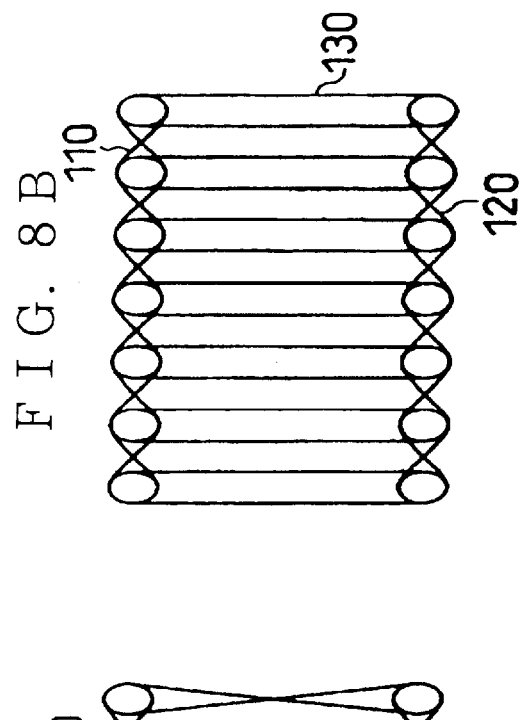
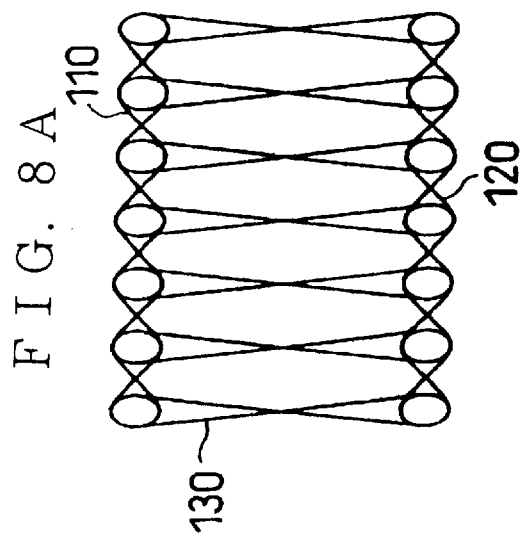
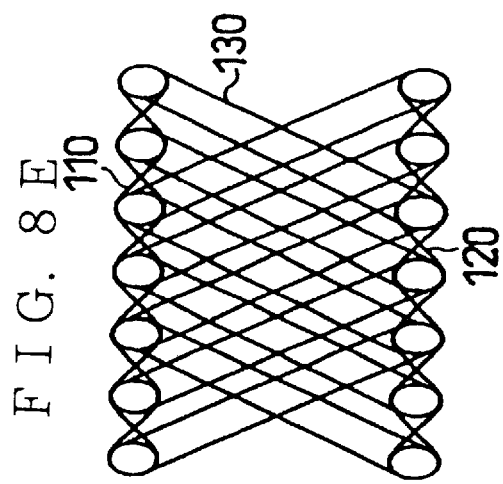
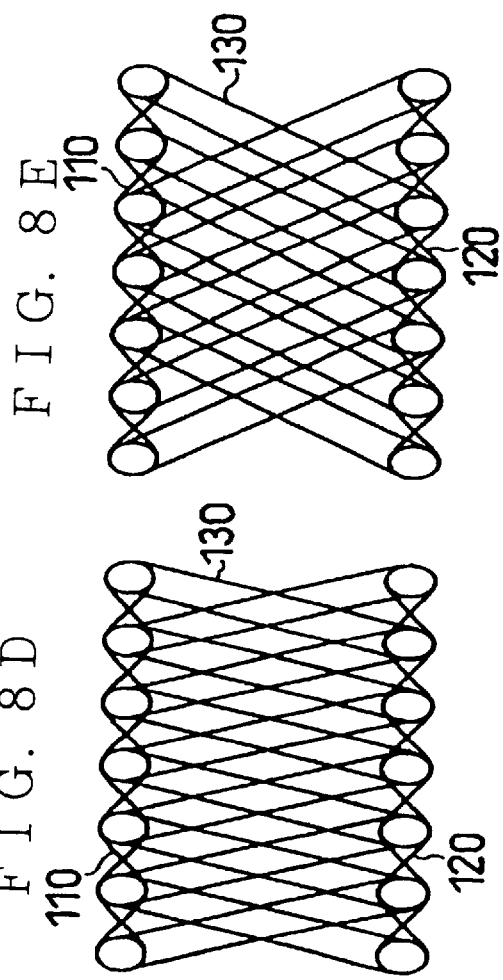
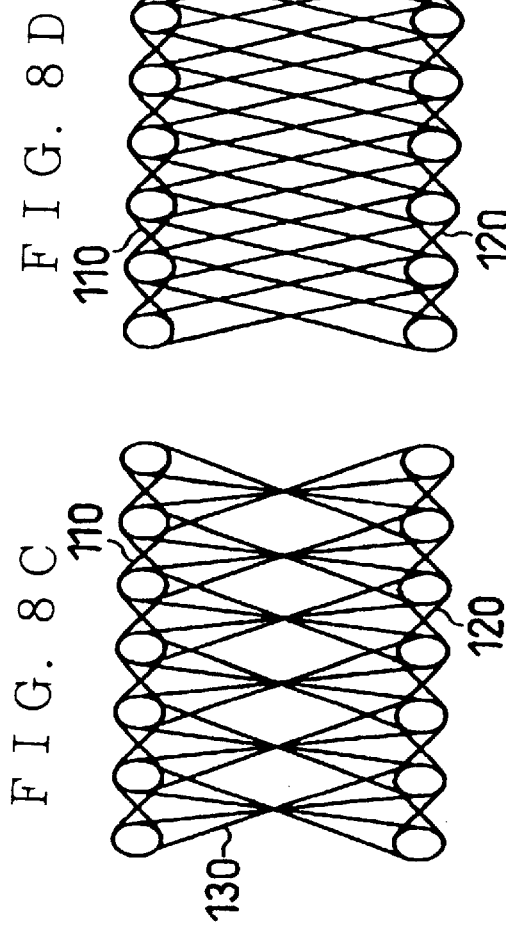

VEHICLE SEAT

BACKGROUND OF THE INVENTION

The present invention relates to a vehicle seat of a car, a train, and so on.

In recent year, a vehicle seat using a net member which has a three-dimensional structure, exhibits a high cushioning property even with a thin type compared to a pad member such as polyurethane and the like, and has a plenty of pores to be excellent in air permeability, has been known. The net member is made to have a truss structure (three-dimensional structure) by connecting a front layer and a back layer with a plenty of piles so as to be an elastic structure difficult to settle, and, therefore, is excellent in permeability, body pressure dispersing property, impact absorption characteristics, and so on.

Incidentally, in a vehicle seat, not limited to the case when a net member having a three-dimensional structure is used as the vehicle seat, a sheet-shaped supporting member such as a so-called Pullmaflex and the like which is supported by frame members through metal springs is usally provided under the seat cushion to support an outer layer member elastically and to improve vibration absorption characteristics. Since a net member having a three-dimensional structure exhibits a high cushioning property, excellent impact absorption characteristics and the like, as described above, a net member having a thickness thinner than that of a pad member made of polyurethane and the like can be used for a vehicle seat. However, since the metal springs to support the sheet-shaped supporting member are disposed under the seat cushion, a feeling of something foreign created by the metal springs is apt to be felt. Especially in the vicinity of a greater trochanter where a large load is added, the feeling of something foreign is easily transmitted. This is not limited to a net member having a three-dimensional structure, the same tendency is seen when a relatively thin polyurethane material is used for the outer layer member. Therefore, reduction of such a feeling of something foreign created by metal springs has been hitherto required.

Metal springs which support the sheet-shaped supporting member are arranged in a manner that a plurality of the metal springs per each side of the sheet-shaped supporting member are disposed between each side portion of the sheet-shaped supporting member and each frame member substantially facing thereto at appropriate intervals from the vicinity of the front end to the vicinity of the rear end of the sheet-shaped supporting member. The metal springs are disposed in such a manner that when a load is added by seating of a human body, usually all of these metal springs serve as to enforce each side portion of the sheet-shaped supporting member and each frame member substantially opposing thereto in directions to pull each other, thereby the vibration absorption function is performed by all metal springs.

However, with such a construction, the number of the metal springs serving functionally is the same, regardless of the magnitude of body weight (added load) of the seated person. Accordingly, when the body weight of the seated person varies, the natural frequency of the sheet-shaped supporting member supported by the metal springs is also varied, and a desired vibration characteristic can not be exhibited depending on a body weight of the seated person, which results in dependency on the added load.

The outer layer member using a net member having a three-dimensional structure is usually supported in such that most portions of the peripheral edge thereof are wound around respective frame members constituting a seat frame, which results in a tensile structure in which the outer layer member is put up in a high percentage elongation (for instance, in a range of 10 to 20%) on the seat frame, and there is a room for improvement in view of vibration absorption characteristics at the point more than the resonance point. In order to improve this point, the net member having a three-dimensional structure has to be put up in a low percentage elongation. However, in such a case, there arises a disadvantage that the riding comfort of the car is spoiled due to large sinking-in of the body when seated.

Furthermore, when the seats having different outside design are produced by using plural sorts of outer layer member which are different in shape, material, sew line, or the like, it is normally accompanied by a considerable degree of improvement such as modification of the frame shape and the like to prevent the riding comfort of the car and the like from being greatly spoiled due to the modification of the outside design. However, flexibility in the outside design comes to be low under such a circumstance, therefore it is required to achieve the same riding comfort of the car, and the same vibration characteristic without accompanying improvement in the shape of the frame and the like, even when any sort of outer layer member is used.

SUMMARY OF THE INVENTION

The present invention is carried out in view of the above-described circumstances, and its object is to provide a vehicle seat which reduces the feeling of something foreign created by metal springs supporting a sheet-shaped supporting member, and lowers the dependency of vibration characteristic exhibited by the sheet-shaped supporting member supported by the metal springs on an added load. The further object of the present invention is to provide a vehicle seat which improves the riding comfort of the car by restraining sinking-in of the body when seating and has a large flexibility in selecting an outside design.

In accordance with one aspect of the present invention, a vehicle seat is provided to achieve the objects described above. The vehicle seat comprises a sheet-shaped supporting member connectedly supported under an outer layer member constituting a seat cushion by appropriate frame members disposed apart from each other at a distance in the width direction at each side portion of the sheet-shaped supporting member through a plurality of metal springs per each side portion, and the sheet-shaped supporting member supporting the seat cushion and giving the restoring force, wherein the metal spring provided on the position to support the vicinity of the greater trochanter of the seated person in the plurality of the metal springs described above, is provided in a manner that the engagement portion with the frame member is positioned lower than that of the engagement portion with the sheet-shaped supporting member when no load is applied, and within a range of a predetermined added load, the metal spring does not work functionally with each other because respective engagement portions take their positional relationship to be substantially horizontal in a static seating state, while the metal spring works functionally when the added load exceeds the above-described range.

In a preferred embodiment of the present invention, a belt-like member is hung over between the above-described sheet-shaped supporting member and any of the frame members to restrain the reaction force after deformation of the metal spring.

In a preferred embodiment of the present invention, the outer layer member is a net member having a three-dimensional structure in which a front layer and a back layer are connected with a large number of piles.

In a preferred embodiment of the present invention, the outer layer member comprises an inner net which is put up with the frame members to control the sinking-in amount of the body of seated person when seating, and an outer net which covers at least a portion of the inner net, and is put up with the frame members at a percentage elongation of less than 5% when the design standard load is given, and wherein at least the inner net is formed of a net member having a three-dimensional structure in which the front layer and the back layer are connected with a large number of piles.

BRIEF DESCRIPTION OF THE DRAWINGS

FIG. 8A to FIG. 8E are views to explain a manner of disposing piles.

DETAILED DESCRIPTION OF THE PREFERRED EMBODIMENT

Figure 1:
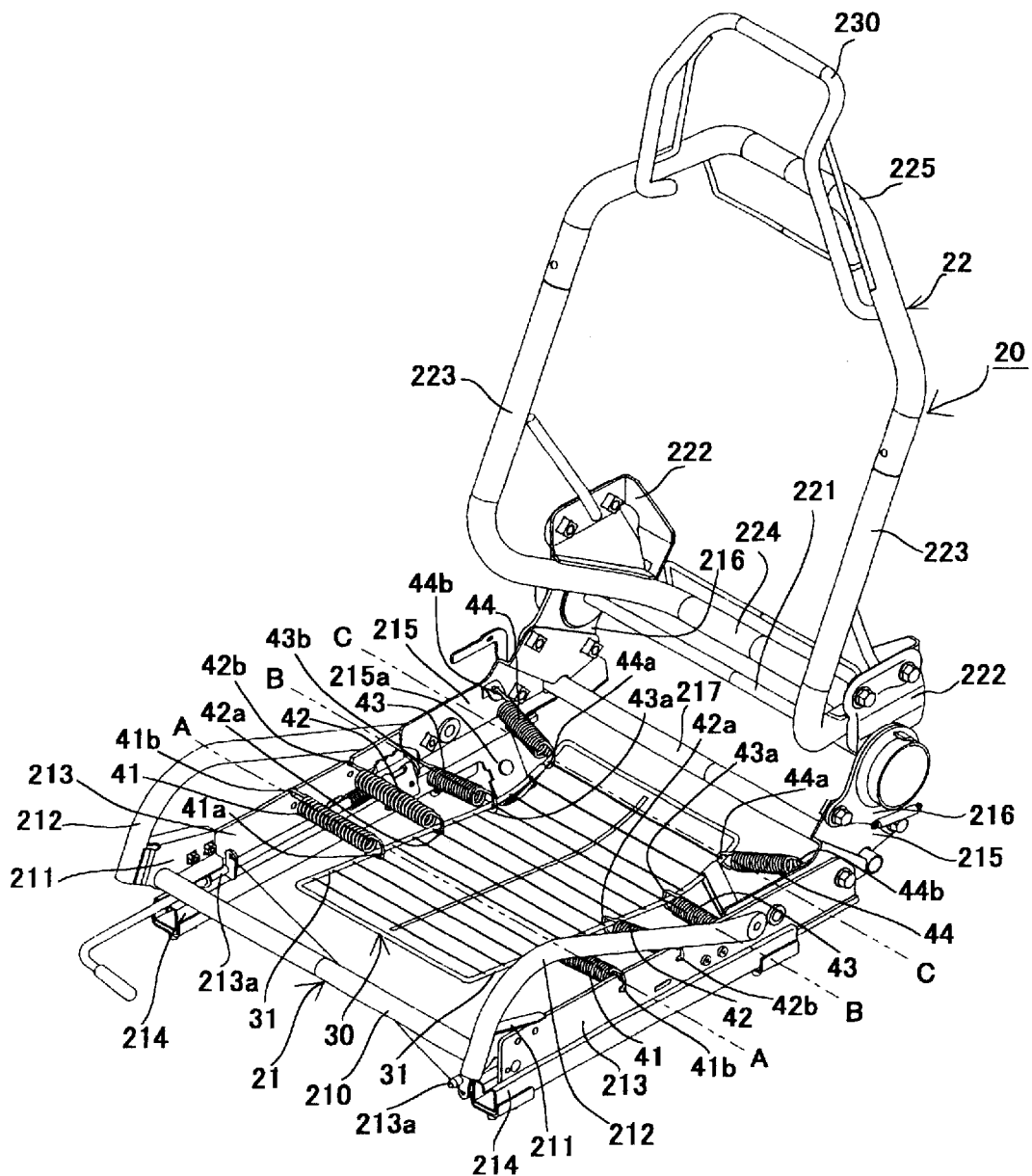
FIG. 1 is a perspective view showing a whole structure of a seat frame constituting a vehicle seat according to a first embodiment of the present invention.

The present invention will be explained hereinafter in more detail based on preferred embodiments shown in the drawings. FIG. 1 is a view showing a whole structure of a seat frame 20 constituting a vehicle seat 10 according to an embodiment of the present invention.

The seat frame 20 comprises a cushion frame 21 to form a seat cushion and a back frame 22 to form a seat back. The cushion frame 21 comprises a front end frame 210 composed of a pipe frame member at a front end, and side frames 212 and 212 connected through connecting plates 211 and 211 disposed on respective ends of the front end frame 210. The side frames 212 and 212 are formed in a curved shape in a manner that the vicinity of the front end is bulged out upward, so that the front end gets a predetermined shape by putting up the outer layer member 50. Plate-shaped side supporting frames 213 and 213 are connected to the connecting plates 211 and 211, and the rear ends of the side frames 212 and 212 described above are connected to near the rear ends of the side supporting frames 213 and 213.

The side supporting frames 213 and 213 are supported by rail members 214 and 214 which are fixed on the floor of the vehicle, and arranged to be slidable in the fore-and-aft direction along the rail members 214 and 214. Connection plates 215 and 215 are fixed near the rear end of the side supporting frames 213 and 213, and brackets 216 and 216 are further attached on respective connection plates 215 and 215 so as to extrude out diagonally upward. The back frame 22 is connected through the brackets 216 and 216. A pipe-shaped rear end frame 217 is disposed to lay over between the connection plates 215 and 215 to keep the distance between the side frames 212 and 212, between the side supporting frames 213 and 213, and the like, and to maintain the shape of the frame.

A supporting shaft 221 is laid over between the brackets 216 and 216, and back connecting members 222 and 222 are disposed on the supporting shaft 221 pivotably in the fore-and-aft direction. The back frame 22 includes side frames 223 and 223, a lower end frame 224 and an upper end frame 225 as shown in FIG. 1. The lower end frame 224 is curved to be substantially in a shape of the letter U seen from above and respective ends of the lower end frame 224 are connected to respective lower ends of the side frames 223 and 223, so that the side frames 223 and 223 are disposed to project forward as they go from their upper ends toward their lower ends. The vicinities of both sides of the lower end frame 224 are connected to the back connecting members 222 and 222 and the whole of the back frame 22 is arranged to pivot in the fore-and-aft direction.

The upper end frame 225 is formed to be substantially in a shape of the letter V so that near the central portion thereof is extruded out upward and the both ends of the upper end frame 225 are disposed to connect to the upper ends of the side frames 223 and 223. A frame member 230 for a headrest, which is formed substantially in a shape of the letter U, is connected and fixed nearly on the central portion of the upper end frame 225, while arranging its closed side on the upper side.

The sheet-shaped supporting member 30 is disposed to the cushion frame 21. As the sheet-shaped supporting member 30, for instance, a so-called Pullmaflex in which metal wire is formed into a grid shape or a reed screen shape can be used. However, it is not limited to a so-called Pullmaflex for the sheet-shaped supporting member 30, any material can be used so far as it can support the outer layer member 50 with its surface. For instance, such a material in which plural sheets of net members 100 having a three-dimensional structure to be used as a material for the outer layer member which will be described later are made into multi-layered and welded partly with each other to enhance its stiffness can be used as the sheet-shaped supporting member 30.

The sheet-shaped supporting member 30 is disposed by putting up through the metal springs 41 to 44 which are engaged with any frame members constituting the seat frame 21. Concretely, the metal springs 41 to 44 are made of coil springs, and, in the present embodiment, are disposed by 4 pieces per each side at predetermined intervals on respective sides 31 and 31 of the sheet-shaped supporting member 30 from the front end side to the rear end side. Respective one ends 41a to 44a of the metal springs 41 to 44 are engaged with respective sides 31 and 31 of the sheet-shaped supporting member 30. On the other hand, respective the other ends 41b to 44b of the metal springs 41 to 44 are engaged with both frame members substantially facing to the sides 31 and 31 respectively. The height of respective engagement positions of the other ends 41b to 44b are not uniform.

That is, as shown in FIG. 1, FIG. 2A, FIG. 2B, and FIG. 2C, the other ends 41b and 41b, 42b and 42b of the first metal springs 41 and 41, and the second metal springs 42 and 42 which are up to the second metal spring when counting from the front end side, are engaged with the upper end edges of the side supporting frames 213 and 213. Next, the other ends 43b and 43b of the third metal springs 43 and 43 which are disposed at the third from the front end side and positioned under or near the greater trochanter of the seated person, are engaged at the position lower than the one ends 43a and 43a which are engaged with the sides 31 and 31 of the sheet-shaped supporting member 30. Though any frame member can be used as an engagement object of the other ends 43b so far as it can be engaged at a position lower than that of the one end 43a, in the present embodiment, since locking bar members 213a and 213a to control a slide movement along the rail members 214 and 214 are disposed along the vicinity of the edges of the inside lower ends of the side supporting frames 213 and 213, the other ends 43b and 43b are engaged with the bar members 213a and 213a. The other ends 44b and 44b of the fourth metal springs 44 and 44 disposed at the most rear end side are engaged with the connection plates 215 and 215 at near the upper portions.

Here, fixing plates 215a and 215a which are protruding toward the inside with each other and slantingly downward are provided on the connection plates 215 and 215. The ends of the belt-like member 240 are fixed to the fixing plates 215a and 215a (refer to FIG. 2C). The belt-like members 240 is engaged with the sides 31 and 31, between the third metal spring 43 and the fourth metal spring 44, of the sheet-shaped supporting member 30 at the middle portions thereof, thereby the reaction force of the metal springs 41 to 44 after the deformation is restrained and the spring up of the sheet-shaped supporting member 30 is restrained.

Figure 3:
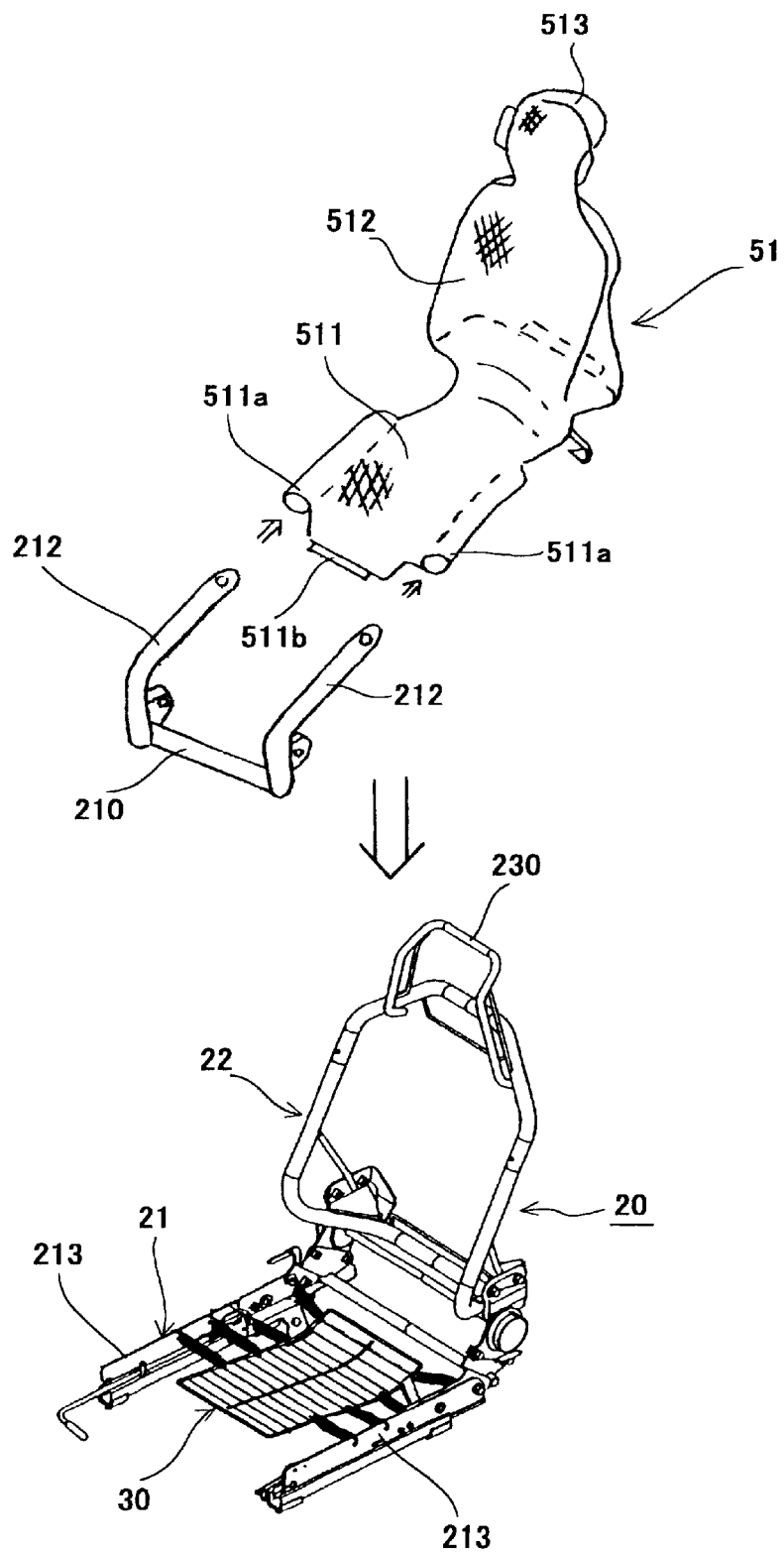
FIG. 3 is a view showing a state of installing an inner net on a seat frame.

The outer layer member 50 is composed of an inner net 51 and an outer net 52 in the present embodiment. The inner net 51 is composed of the seat cushion part 511 and the seat back part 512 which are united integrally as shown in FIG. 3. As for the seat cushion part 511, side edge portions 511a and 511a of the seat cushion part 511 cover the side frames 212 and 212 of the cushion frame 21, then are turned back and connected with each other in the inside of the side frames 212 and 212 by means of sewing and the like. A front edge portion 511b is connected to the front end frame 210. The seat back part 512 of the inner net 51 is formed in a bag shape including a headrest portion 513 at the upper portion. After the frame 230 for forming the headrest is covered with the headrest portion 513, the seat back part 512 of the inner net 51 covers the whole back frame 22. The inner net 51 arranged as above is fixed to any frame members of the back frame 22 in a state that the vicinity of the lower portion of the seat back part 512 is pulled backward. In addition, the seat back part 512 is fixed to any frame members at several points to shape into the inner net 51.

The inner net 51 is put up at a percentage elongation required to restrain a large sinking-in of the body of the seated person. Though this percentage elongation differs depending on the elasticity (easiness to elongate) of the inner net 51, when the outer net 52 is put up at a lower percentage elongation so as to reduce the vibration and to improve the riding comfort of the car as will be described later, the inner net 51 is put up at a percentage elongation with which the sinking-in is restrained more compared with the case when the outer net is put up alone, because the amount of the sinking-in becomes large if the outer net is put up alone. In order to achieve such a function, though it is generally preferable to put up the inner net 51 at a percentage elongation higher than that of the outer net 52, it is possible to put up the inner net 51 at a percentage elongation similar to or lower than the percentage elongation of the outer net 52, depending on the elasticity (easiness to elongate) of the inner net 51 itself.

Figure 5:
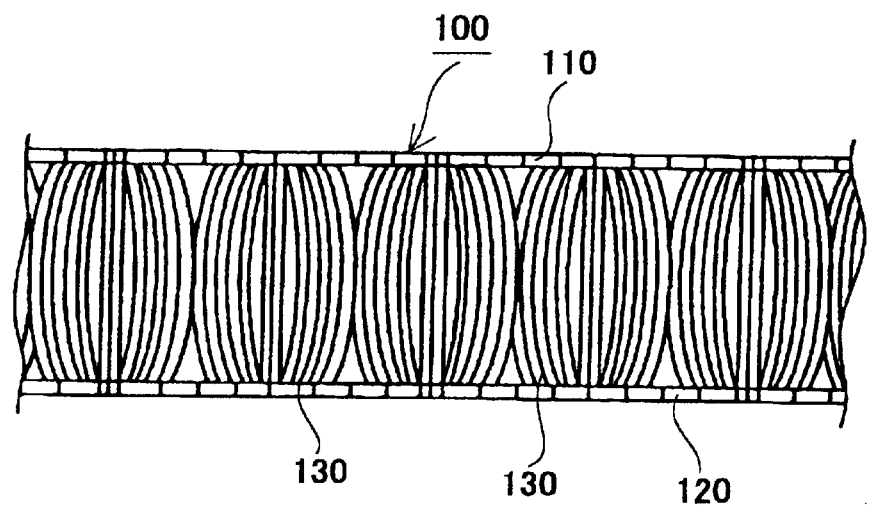
FIG. 5 is a sectional view showing a portion of a net member having a three-dimensional structure which is used in each of the embodiments described above.

It is preferable for the inner net 51 to use a net member 100 having a three-dimensional structure as shown in FIG. 5 to FIGS. 8A to 8E. The net member 100 having a three-dimensional structure is made to have a truss structure (three-dimensional structure), comprising a front layer 110, a back layer 120 and a large number of piles 130 which connect the front layer 110 and the back layer 120 as shown in FIG. 5.

Figure 6:
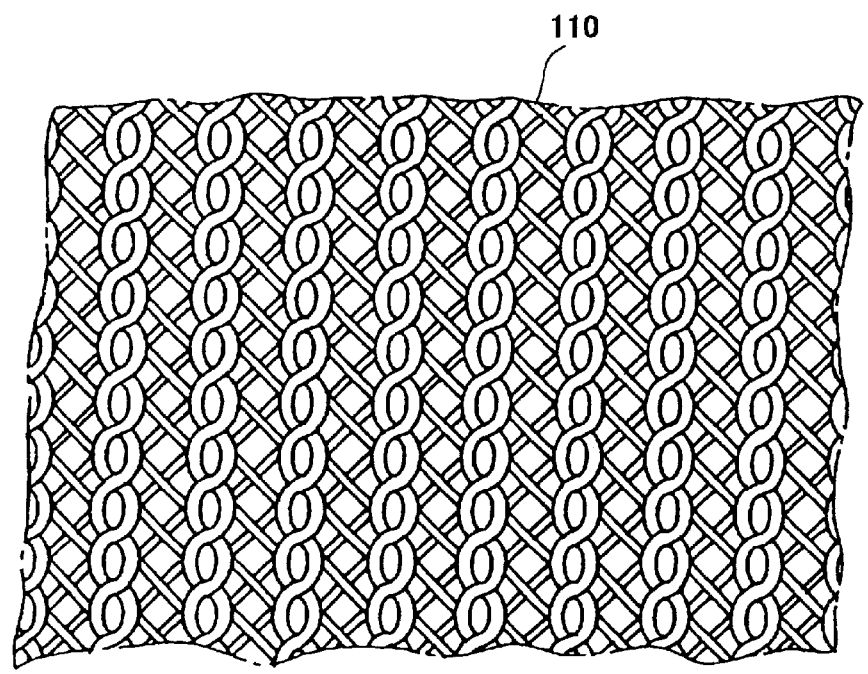
FIG. 6 is an enlarged view showing a front layer of the net member shown in FIG. 5.
Figure 7:
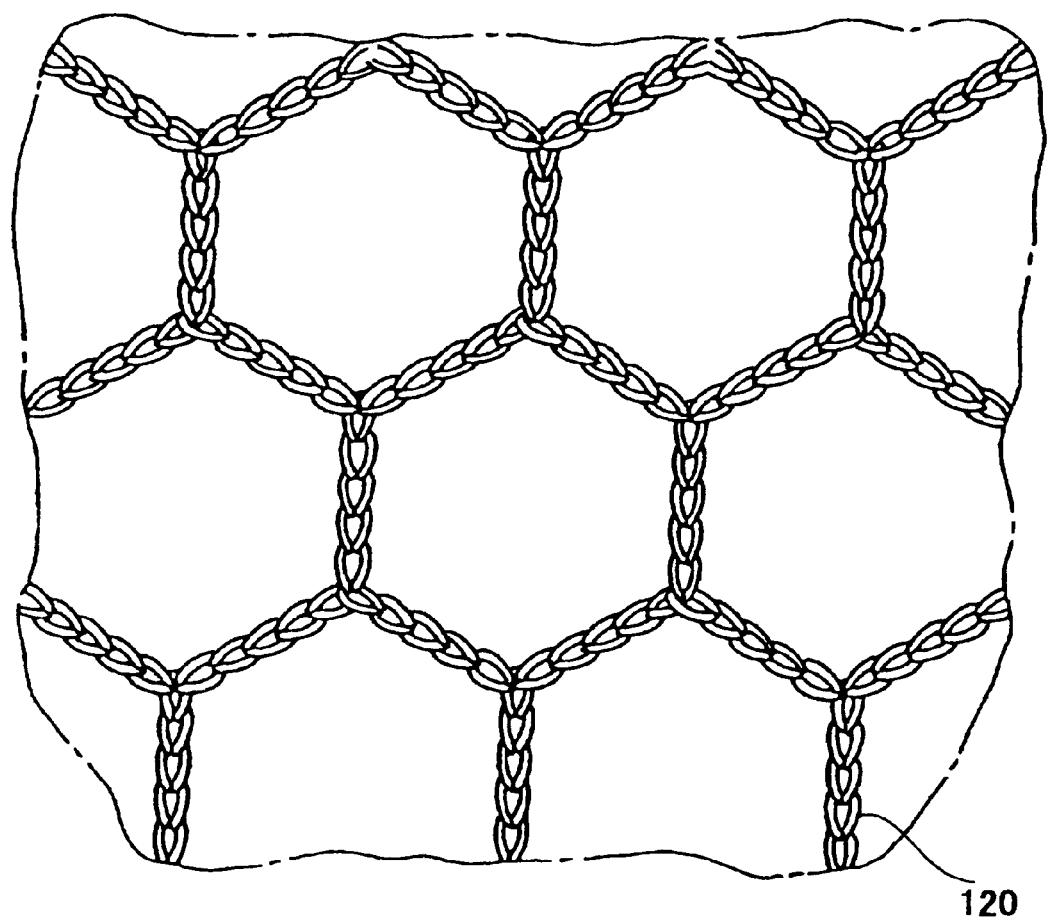
FIG. 7 is an enlarged view showing a back layer of the net member shown in FIG. 5.

The front layer 110 is formed into a structure having small meshes (fine mesh) by rib knitting of multifilaments stranded from monofilaments for instance, as shown in FIG. 6. On the other hand, the back layer 120 is formed into a structure having stitches larger than that in the front layer 110 which has a honeycombed (hexagonal) mesh with multifilaments stranded from monofilaments for instance, as shown in FIG. 7. The pile 130 is formed with monofilaments or multifilaments, which are knitted between the front layer 110 and the back layer 120 so that the front layer 110 and the back layer 120 maintain a predetermined space from each other, thereby giving a predetermined stiffness to the net member 100 which is a stereoscopic mesh knit. Incidentally, when the word "fiber" is simply used in this description, it means to include spun yarn as well as a monofilament and a multifilament.

In addition, though a layer having a small mesh made by rib knitting is defined as the front face in the above explanation (for instance, a surface of the seat cushion and the seat back facing to the human body), it is acceptable to define the above as the back face, and a layer having a honeycombed mesh as the front face. It is also acceptable to adopt a mesh shape other than a honey combed shape or a fine mesh shape as a structure of the mesh layer.

As a fiber material to compose the front layer 110, the back layer 120, or the pile 130, a thermoplastic resin is preferable. The following resins can be used, for instance, thermoplastic polyester resin such as polyethylene terephthalate (PET) and polybutylene terephthalate (PBT), polyamide resin such as nylon 6 and nylon 66, polyolefin resin such as polyethylene and polypropylene, or a mixed resin containing two kinds or more of these resins.

As the pile 130, a fiber having 380 d or more, preferably 600 d or more can be used. Then, the load of the seated person can be supported by the deformation of the mesh composing respective layers 110 and 120, falling of the pile 130, buckling characteristics of the pile 130, and the restoring force of the adjacent piles 130 which give spring characteristics on the buckling characteristics. That is, it can be supported by the buckling characteristics having a restoring force so that the seat can be of a soft structure without concentration of stress. Additionally, examples of property values of the net member 100 having a three-dimensional structure described above will be shown in the following table for reference.

TABLE 1

| NUMBER | 1 | 2 | 3 | 4 | 5 | 6 |
|---|---|---|---|---|---|---|
| MATERIAL | NYLON | POLYESTER | ← | ← | ← | ← |
| WEIGHT (g/m$^2$) | 888 | 784 | 864 | 984 | 876 | 1128 |

TABLE 1-continued

| NUMBER | 1 | 2 | 3 | 4 | 5 | 6 |
|---|---|---|---|---|---|---|
| DENSITY | | | | | | |
| LONGITUDINAL (PIECE/inch) | 8.0 | 7.5 | ← | 8.5 | 7.0 | 8.5 |
| LATERAL (PIECE/inch) | 14.0 | 13.0 | ← | ← | 14.0 | 13.0 |
| THICKNESS OF FIBER | | | | | | |
| FRONT FACE | 220d/1f | 1300d/96f | ← | ← | ← | ← |
| BACK FACE | | 500d/70f | ← | ← | ← | ← |
| PILE | 880d/1f | 600d/1f | ← | ← | 800d/1f | ← |
| TENSILE STRENGTH (kg/5 cm) | | | | | | |
| LONGITUDINAL | 38.0 | 156.9 | 158.4 | 152.1 | 148.7 | 159.3 |
| LATERAL | 24.8 | 62.1 | 79.4 | 136.5 | 57.5 | 130.1 |
| ELONGATION (%) | | | | | | |
| LONGITUDINAL | 111.1 | 56.2 | 62.5 | 48.3 | 50.1 | 50.2 |
| LATERAL | 189.3 | 66.4 | 68.2 | 43.3 | 78.0 | 40.0 |
| TEAR STRENGTH (kg) | | | | | | |
| LONGITUDINAL | 33.8 | 87.9 | 79.2 | 75.0 | 91.1 | 77.7 |
| LATERAL | 26.2 | 49.2 | 44.9 | 63.7 | 41.1 | 66.7 |
| DISTORTION PATIO BY REPEATED LOADING | | | | | | |
| LONGITUDINAL | — | 2.6 | ← | 2.7 | 1.4 | 1.2 |
| LATERAL | — | 10.6 | 2.7 | 5.6 | 4.6 | 0.2 |
| ABRASION RESISTANCE | | | | | | |
| LONGITUDINAL | — | 4.5 | ← | ← | ← | ← |
| LATERAL | — | 4.0 | ← | 4.5 | ← | ← |
| MESH LAYER STRUCTURE | | | | | | |
| FRONT | MESH | HONEY COMB | ← | MESH | HONEY COMB | MESH |
| BACK | MESH | FINE MESH | ← | FINE MESH | FINE MESH | FINE MESH |
| PILE STRUCTURE | PARALLEL | CROSS | PARALLEL | CROSS | PARALLEL | CROSS |

As a manner of disposing the pile 130 (pile structure), it can be classified by a state being seen from the side face of the piles 130 connecting between the front layer 110 and the back layer 120, more concretely, for instance, it can be classified into the following types shown in FIGS. 8A to 8E. FIG. 8A and FIG. 8B show a straight type in which the piles 130 are disposed to connect between respective fibers composing the front layer 110 and respective opposing fibers composing the back layer 120, in which FIG. 8A shows a straight type knitted in the shape of the letter "8", while FIG. 8B shows simply knitted straight. FIG. 8C to FIG. 8E show cross types in which the piles 130 are knitted between respective adjacent threads for the front layer 110 and respective adjacent threads for the back layer 120 in such a manner that the piles 130 cross each other at the halfway. Among them, FIG. 8C shows a type in which the piles 130 cross in the shape of the letter "8", FIG. 8D shows another cross type in which the piles 130 are knitted in a simple cross, and FIG. 8E shows still another cross type in which the piles 130 are crossed each other bringing two pieces together (double cross).

Figure 4:
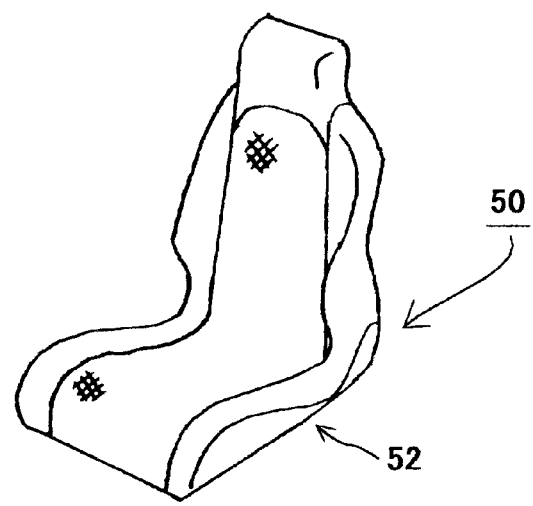
FIG. 4 is a view showing a state of installing an outer net on the seat frame on which the inner net is installed.
Figure 4:
Figure 4:
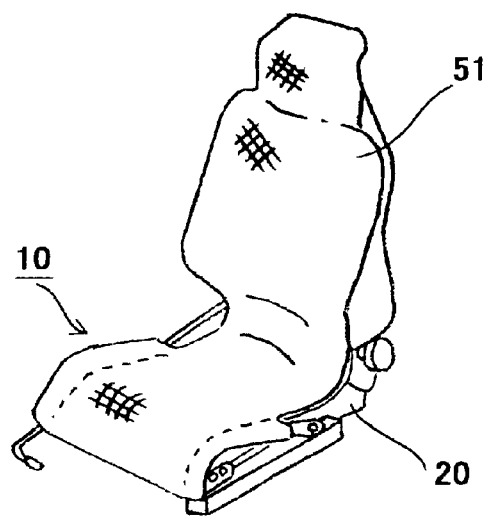

The outer net 52 is formed to show a predetermined appearance and shape (high quality image, position of the sewing line and the like) as shown in FIG. 4, and is put up by engaging the end portions of the outer net 52 with suitable frame member so as to cover the inner net 51. In this case, it is preferable to put up the outer net 52 at the percentage elongation of less than 5% when the design standard position and design standard load of the posture is given. Then, it becomes possible to reduce or prevent deformation of the outer net 52 by a large load and settling of the outer net 52 by thermal shock, and it also becomes possible to make the spring property of the outer net 52 work effectively to change the direction of the input vibration so as to improve vibration absorption characteristics.

As a means to put up an end portion of the outer net 52 with a suitable frame member, several means as follows can be used, that is, a plate member having a groove in a sectional shape of the letter "U" is fixed on the end portion of the outer net 52 and the groove portion of the plate member is engaged with a suitable frame member, a trim cloth is further connected to the end portion of the outer net 52 and the above-described plate member is fixed firmly on the trim cloth to engage with a suitable frame member, and so on.

As described above, it is preferable for the outer net 52 to have a structure that the outer net 52 itself exhibits the predetermined spring property to contribute for the vibration absorption characteristics, and for this purpose, for instance, the net member 100 having a three-dimensional structure similar to the above-described inner net 51 can be used. In this case, however, it is preferable to use a net member in which the face contacting with the human body has a mesh layer strongly tightened and finely meshed, out of the front layer 110 and the back layer 120, to improve the appearance and the riding comfort of the car. Alternatively, a pad material made of polyurethane material and being relatively thin in thickness can be used.

Figure 2A:
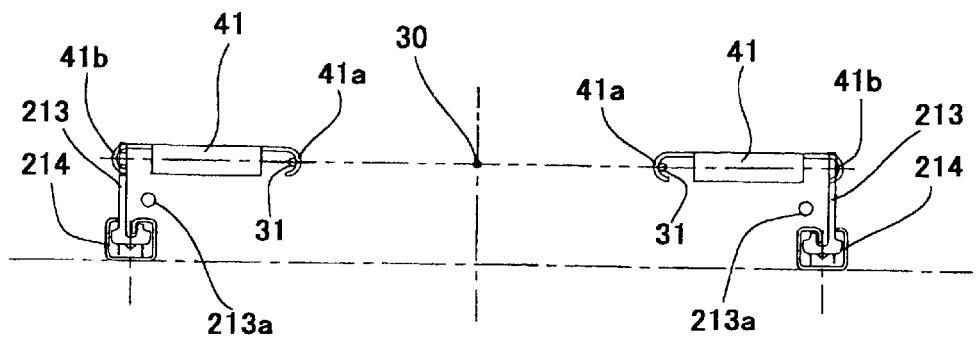
FIG. 2A is an end view along the A—A line in FIG. 1.
Figure 2B:
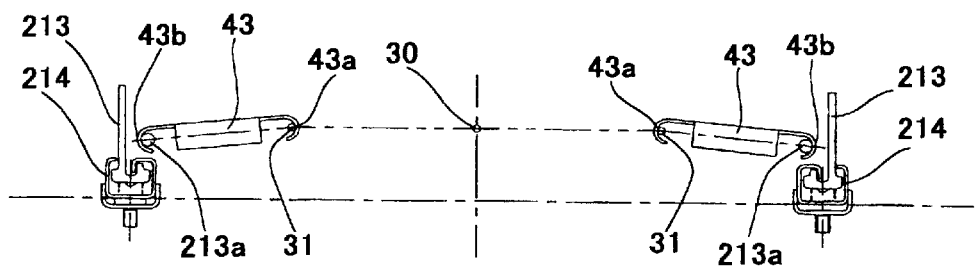
FIG. 2B is an end view along the B—B line in FIG. 1.
Figure 2C:
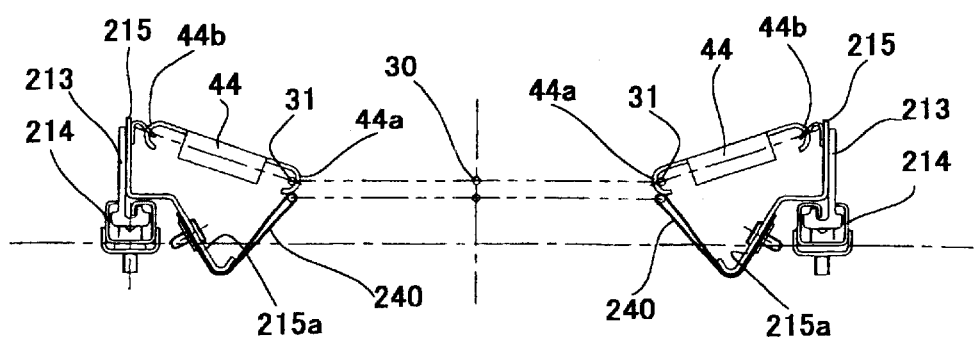
FIG. 2C is an end view along the C—C line in FIG. 1.

According to the vehicle seat 1 of the present embodiment, among the metal springs 41 to 44, which support the sheet-shaped supporting member 30, the third metal springs 43 and 43 which are located under or near the greater trochanter of the seated person are disposed in a manner that the other ends 43b and 43b of the third metal springs 43 and 43 are engaged with the bar members 213a and 213a disposed along the vicinity of inside lower end edges of the side supporting frame members 213 and 213. As a result, the positional relationships between the metal springs 41 to 44 when no load is applied are as shown in FIG. 2A, FIG. 2B and FIG. 2C. That is, in the first metal springs 41, one end 41a and the other end 41b thereof are arranged almost in horizontal as shown in FIG. 2A. As for the second metal spring 42, one end 42a and the other end 42b are arranged almost in horizontal similar to the case of the first metal spring 41 though not shown. On the other hand, in the third metal springs 43 and 43 supporting the vicinity of the greater trochanter, one ends 43a and 43a connected to side portions 31 and 31 of the sheet-shaped supporting member 30 are located a little higher than the other ends 43b and 43b. In the fourth metal springs 44 and 44, one ends 44a and 44a connected to side portions 31 and 31 of the sheet-shaped supporting member 30 are located lower than the other ends 44b and 44b.

Therefore as clear from FIG. 2A, FIG. 2B and FIG. 2C, when a load is added, for instance, when the position of the sheet-shaped supporting member 30 is lowered through being seated by a person, the first metal spring 41, the second metal spring 42 and the fourth metal spring 44 are elongated so that the spring forces become effective. However, since the third metal spring 43 is in a state of little elongation so far as the position of the one end 43a remains substantially at the same level as the position of the other end 43b even when the one end 43a lowers its position, the spring force hardly works in a static seating state. That is, the third metal spring 43 is arranged in such a manner that force of the spring works functionally only when a person having equal to or more than predetermined weight takes seat or when a relative load added by large vibration is equal to or more than a predetermined amount.

Here, the natural frequency $F_0$ is expressed by the following equation.

$$F_0 = 1/2 \ \pi \cdot \sqrt{k/m}$$ [Equation 1]

(here, k is a spring constant, m is added load)

For instance, when a person having a weight of 60 kg takes seat and the third metal spring 43 is in a state of not working functionally as described above, the number of the springs which are working functionally is 6 pieces, the above equation comes to;

$$F_0 = 1/2 \ \pi \cdot \sqrt{6k/60(kg)}$$ [Equation 2]

When a person having a weight of 80 kg takes seat, the position of the one end 43a of the third metal spring 43 is supposed to lower below the position of the other end 43b and the force of the spring works functionally, the above equation comes to;

$$F_0 = 1/2 \ \pi \cdot \sqrt{8k/80(kg)}$$ [Equation 3]

Therefore, the natural frequency obtained by Equation 2 becomes the same as the natural frequency obtained by Equation 3, and it is found that change of the riding comfort of the car and the vibration characteristic can be prevented depending on the magnitude of the added load. In addition, in order to reduce the feeling of something foreign created by the metal springs 41 to 44, thought it is possible to take measures in such that the end portion of the outer net 52 positioned over the metal springs 41 to 44 is folded into two layers or the like, such a measure sometimes allows a feeling of something foreign to remain depending on the thickness of the outer net 52. Especially, the feeling of something foreign created by the metal spring which supports the seated person generally becomes large due to large deflection in the vicinity of the greater trochanter of the seated person. However, according to the present embodiment, since the other end 43b of the third metal spring 43 arranged at such a position, and connected to the frame member, is disposed below the position of the one end 43a connected to the side portions 31 and 31 of the sheet-shaped supporting member 30, the feeling of something foreign created by the third spring 43 becomes extremely small.

In the vehicle seat 1 according to the present embodiment, the outer layer member 50 comprises the inner net 51 and the outer net 52, and the inner net 51 is put up at a percentage elongation necessary to restrain a large sinking-in of the body of seated person. Accordingly, although the outer net 52 is put up at a low percentage elongation to reduce the vibration and to improve the riding comfort of the car, a seat which prevents a large sinking-in and secures an excellent riding comfort of the car by combining the outer net 52 with the inner net 51 can be provided. In addition, even when other design (shape, a high quality image, position of the sewing line, and others) is adopted for the outer net 52, so far as a material having the same shape, quality, and the same percentage elongation is used to put up as the inner net 51, it is possible to modify in design without a large variation in the vibration absorption characteristics and the riding comfort of the car.

As explained above, the vehicle seat of the present invention is put up in a manner that, among a plurality of metal springs supporting the sheet-shaped supporting members, the metal spring provided in a position to support the vicinity of the greater trochanter of the seated person is located at a position where the engagement portion with the frame member is lower than the engagement portion with the sheet-shaped supporting member when no load is applied. Accordingly, the feeling of something foreign created by the metal springs can be reduced and within a predetermined range of the added load, each of the engagement portions comes to substantially horizontal relationship with each other, and the metal springs provided in a position to support the vicinity of the greater trochanter of the seated person does not work functionally in a static seating state, and when the added load exceeds the above range, it works functionally. As a result, it is possible to minimize dependency of the vibration characteristic exhibited by the sheet-shaped supporting member supported with the metal springs on the added load. Furthermore, by making the outer layer member into a two-layer structure composed of the inner net and the outer net, it is possible to restrain the sinking-in of the body when seated, so that an excellent riding comfort of the car can be provided owing to the inner net, even when the outer net is put up at a low percentage elongation. Still further, a predetermined riding comfort of the car can be maintained by means of the inner net even when the outer net is modified in design, it is possible to provide a vehicle seat having a large flexibility in selecting an outside design.

While preferred embodiment of the invention have been described with a certain degree of particularity with reference to the drawings, obvious modification and variations are possible in light of the above teachings. The scope of the invention is to be determined from the claim appended thereto.

What is claimed is:

1. A vehicle seat comprising:

a sheet-shaped supporting member, having a pair of side portions, said sheet-shaped supporting member connectedly supported under an outer layer member constituting a seat cushion by frame members being disposed apart from each other at a distance in the width direction at each side portion of the sheet-shaped supporting member;

a plurality of metal springs per each side portion, each of said plurality of metal springs includes a first end and a second end, said first end of said plurality of metal springs coupled to said each side portion of the sheet-shaped supporting member and said second end of said plurality of metal springs coupled to said frame members;

wherein the at least one of the plurality of the metal springs to support the greater trochanter of a seated person and the second end of at least one of the plurality of the metal springs is positioned lower than the first end of the at least one of the plurality of the metal springs when no load is applied and when a load is applied in a seating state the at one of the plurality of the metal springs is without substantial elongation, and wherein the at least one of the plurality of the metal springs is substantially elongated when a larger load is applied in the seating state.

2. The vehicle seat according to claim 1, wherein a belt member is hung over between said sheet-shaped supporting member and any of the frame members to restrain the reaction force after deformation of said metal spring.

3. The vehicle seat according to claim 1, wherein said outer layer member is a net member having a three-dimentional structure said net member having a front layer and a back layer are interconnected to each other by a large number of piles.

4. The vehicle seat according to claim 1, wherein the outer layer member comprises an inner net, said inner net is structured and arranged along with the frame members to control the sinking-in amount of the body of seated person, and an outer net which is structured and arranged along with the frame members to cover at least a portion of the inner net, and a percentage elongation of less than the inner net; and wherein at least the inner net is formed of a net member having a three-dimensional structure said net member having a front layer and a back layer are interconnected to each other by a large number of piles.

* * * * *